April 19, 1927.

W. RATZENSTEIN 1,625,765

VALVED OUTLET FOR PASTEURIZERS

Filed May 10, 1926    2 Sheets-Sheet 1

Inventor:
William Ratzenstein,
By Wm. F. Freudenreich,
Atty.

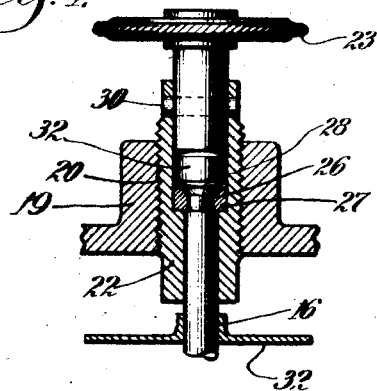
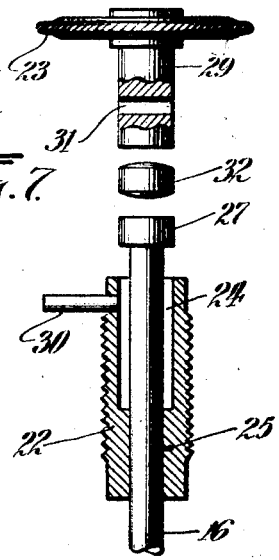
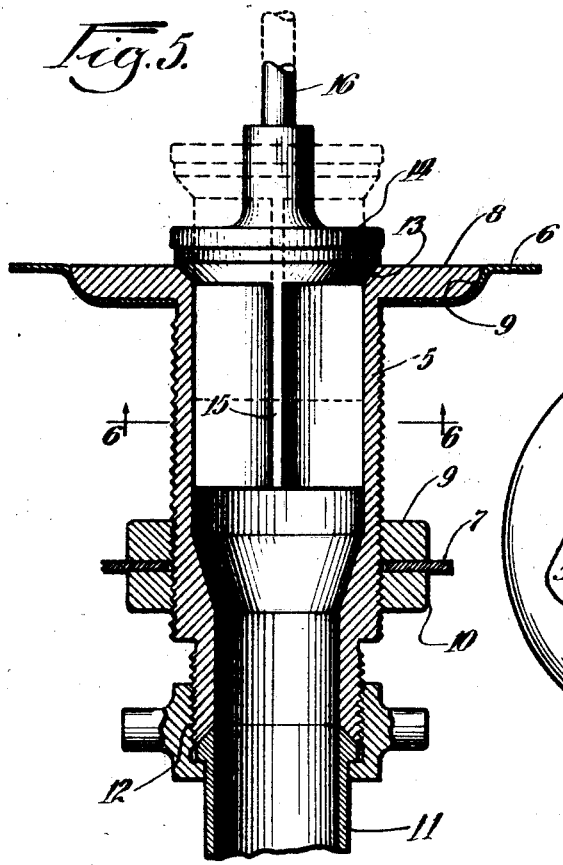

Patented Apr. 19, 1927.

1,625,765

UNITED STATES PATENT OFFICE.

WILLIAM RATZENSTEIN, OF CHICAGO, ILLINOIS, ASSIGNOR TO CRESCO CREAMERY SUPPLY CO., A CORPORATION OF ILLINOIS.

VALVED OUTLET FOR PASTEURIZERS.

Application filed May 10, 1926. Serial No. 107,918.

The present invention relates to that type of Pasteurizing apparatus in which the milk to be treated is contained in an open-top vessel or shell enclosed within a larger shell, whereby there is formed between the sides and the bottoms of the two shells a chamber for receiving hot water. The milk, after it has been treated, is withdrawn from the bottom of the apparatus through a pipe leading usually to a suitable pump. It is usual to have a shut-off valve in this outlet pipe; but, since this valve is some distance from the effective outlet from the milk chamber, a quantity of milk will enter the pipe, when the Pasteurizer is filled, and will not be Pasteurized. In some cases valves have been provided for the effective outlets from the milk chambers but, in so far as I know, these have all been built into the structure so as to make it difficult to clean them, causing the apparatus to be unsanitary.

The object of the present invention is to produce a simple and novel valve device for the outlet of a Pasteurizer, that will prevent milk from flowing into the discharge pipe until the operator desires that it shall; which shall be capable of permitting the milk to be discharged at any desired rate; and which may readily be taken out and cleaned.

Figure 1:
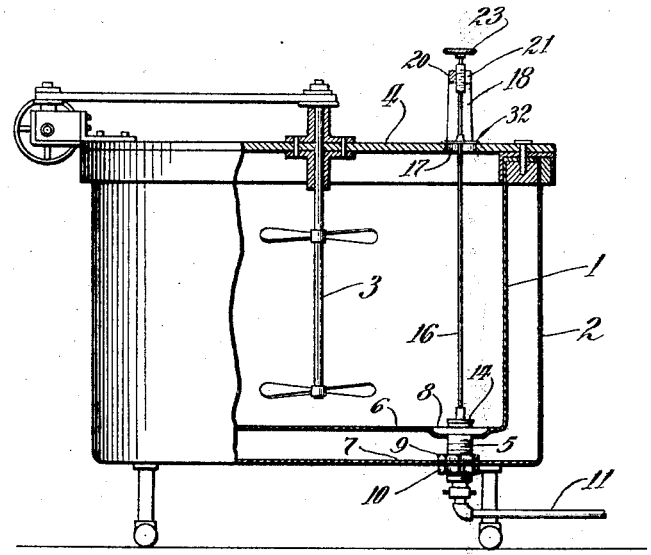
Figure 2:
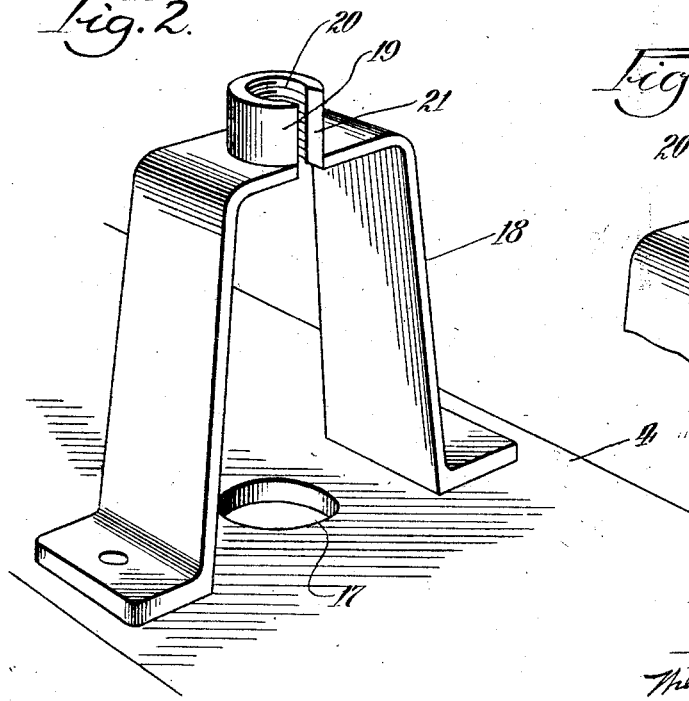
Figure 3:
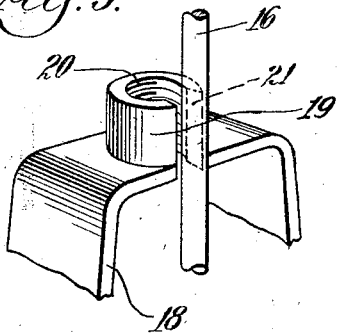

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a view partly in side elevation and partly in section, of a Pasteurizer embodying the present invention; Fig. 2 is a perspective view, on an enlarged scale, of the support for the valve stem and a fragment of the beam on which the support is mounted; Fig. 3 is a perspective view of the upper end of the support for the valve stem and a fragment of the stem, the latter being shown partially withdrawn from the support; Fig. 4 is a view, partly in section and partly in elevation, showing the upper portion of the valve stem and a fragment of the support therefor; Fig. 5 is a vertical section through the outlet fitting and the adjacent portions of the Pasteurizer, the valve being shown closed in full lines and open in dotted lines; Fig. 6 is a section taken on line 6—6 of Fig. 5; and Fig. 7 is a view, partly in section and partly in elevation, showing the upper portion of the valve stem with the parts separated from each other as they appear in the process of assembling them.

Referring to Figure 1 of the drawings, 1 represents a tank or shell open at the top, the same being set within a larger tank or shell 2 to provide a water chamber or jacket around the sides and underneath the bottom of the inner tank. The tank 1 is adapted to contain the milk to be Pasteurized. During the treatment of the milk it is agitated by a stirrer 3 depending from a stationary cross bar extending across the top of the structure. These parts are all old and well known and, of themselves, form no part of the present invention which has to do with the means for discharging the milk after it has been Pasteurized.

As best shown in Fig. 5 an externally screw-threaded sleeve 5 extends down through the flat bottom wall 6 of the tank 1 and the bottom wall 7 of the outer tank 2; the sleeve having an external flange 8 at the top that fits within a depression 9 in the wall 6, so that the upper face of the flange, that is the upper end of the sleeve, lies flush with the top face of the wall 6. Nuts 9 and 10 are screwed above and below the wall 7, clamping this wall between them. This outlet fitting is preferably located near one side of the Pasteurizer, conveniently at the front. Below the Pasteurizer is a pipe 11 for carrying away the milk after it has been treated, this pipe being detachably connected to the lower end of the sleeve 5 by a coupling 12; thereby permitting the discharge pipe 11 to be quickly and easily disconnected from the fitting in order to clean the parts.

The upper end of the sleeve is provided with a conical valve seat 13. Cooperating with this valve seat is a valve 14 having long depending wings 15 that have a sliding fit in the sleeve so as to serve as guides during the raising and lowering of the valve. Fixed to the valve is a stem 16 that extends up through a hole 17 in the bar 4; the hole 17 being somewhat larger in diameter than the valve so as to permit the valve to be drawn upwardly through the same. Mounted on the bar 4, above the hole 17, is a yoke 18 having at the top a hub 19 provided on the interior with screw-threads 20. A vertical slot 21 is cut through one side of the hub and the underlying portion of the yoke, the slot being somewhat wider than the diameter of the valve stem 16, so that the stem may be inserted in the hub or removed therefrom by lateral movement.

It is desirable to be able to lift the valve to any desired extent and hold it in such position, as well as to lock it securely in its closed position. To this end I have mounted on the upper end of the valve stem a screw-threaded plug 22, whose threads mesh with those in the hub, the plug being provided at its upper end with a small hand wheel 23 for turning the same. It will be seen that by turning the plug in one direction or the other the stem, and therefore the valve, will be raised or lowered. In raising or lowering the valve, the latter should not be rotated, since this would produce a grinding action between the valve and its seat while these are in contact with each other. Therefore, the plug is connected to the stem in such a way that they must move as one in the direction of the length of the stem, but are rotatable relatively to each other. As best shown in Figs. 4 and 7, the plug has in the upper portion a central bore 24 larger in diameter than the valve stem 16, this bore connecting with a bore 25 in the lower portion of the plug and of the same diameter as the stem. The extreme upper end of the stem is reduced in diameter as indicated at 26 and, surrounding this reduced portion, is a thick washer 27 loosely held in place by riveting over the top of the part 26, as indicated at 28. The washer or roller 27 is approximately the same diameter as the bore 24, so that when the valve stem is drawn down into the plug, the washer or roller engages with the bottom of the bore 24 which therefore acts as a stop. The hand wheel 23 has a shank 29 of the same diameter as the bore 24 in the plug. This shank is inserted into the top of the plug and is secured thereto in any suitable way as, for example, by means of a pin 30 passing at least part way through the plug and through a hole 31 in the shank of the handle. In order to reduce the friction between the upper end of the valve stem and the bottom of the shank when the hand wheel is turned to rotate the plug, I place within the bore 24 in the plug, between the upper end of the valve stem and the lower end of the shank of the handle, a thick disc 32 having convex top and bottom faces; this disc being loose so that it may either rotate with the shank or remain stationary, depending on where the greatest amount of friction is.

The valve stem is of small diameter compared with the valve and therefore, when the parts of the Pasteurizer are assembled, ready for use, a large open space, leading into the tank for the milk, is left around the valve stem at the hole 17 in the bar 4. For the purpose of closing this space I place on the valve stem, as best shown in Fig. 4, a metal disc 32 having in the center an opening of such size that the valve stem will be a loose fit therein. Therefore, as the valve is raised and lowered, this disc will remain at rest on the bar 4 and prevent the entrance of foreign matter into the milk tank through the hole 17; the disc being somewhat larger in diameter than the hole 17.

When a quantity of milk is to be Pasteurized, the parts are assembled with the plug 22 screwed into the hub of the supporting yoke, if the valve is not already closed, the hand wheel will be turned until the valve is lowered sufficiently to close the same tightly. When the milk is poured into the tank none of it can escape past the valve and therefore all of the milk must remain in the tank and be Pasteurized before it can be discharged. When the milk is to be withdrawn, the hand wheel is turned in a direction to cause the plug, and therefore the valve, to rise. The wings depending from the valve guide the same so as to prevent it from swinging during the limits of its movement in ordinary use. When it is desired to clean the valve, the handle is turned in a direction to raise the plug, the movement being continued until the plug is free of the screw threads in the support. The entire valve device may then be raised so as to bring a part of the valve stem 16 opposite the slot 21 in the hub, and the stem may then be moved laterally out through this slot, completely disconnecting the valve device from its support. After the valve device has been cleaned, it is again placed in position by bringing the stem opposite the slot in the supporting hub, moving the stem through the slot so as to bring it into the hub, and then turning the handle so as to engage the screw threads on the plug with those on the support.

When it is desired to clean the outlet fitting, the valve having been removed, the coupling 12 is unscrewed, disconnecting the discharge pipe 11, and giving access to the outlet fitting from below as well as from the top.

I claim:

1. In combination, a tank having an outlet in the bottom, a valve in the tank for opening and closing the outlet, a valve stem rising from the valve above the top of the tank, and a support for the stem at the top of the tank, the support and the stem being constructed and arranged to permit the valve and stem to be bodily disconnected from the support.

2. In combination, a tank having an outlet in the bottom, a valve in the tank for opening and closing the outlet, a stem rising from the valve above the top of the tank, said stem having an enlarged externally-screwthreaded part near its upper end, and a support for the valve and stem comprising a screwthreaded hub having in the side a slot large enough to permit the main portion of the stem to pass therethrough.

3. In combination, a tank having an outlet in the bottom, a valve in the tank for opening and closing the outlet, a valve stem rising from the valve above the top of the tank, said stem having near the top a part of enlarged diameter, and a support for the stem having an opening to fit said enlarged part of the stem and a slot leading out of the side of the support from said opening; said slot being wide enough to permit the main portion of the stem to pass through the same.

4. In combination, tank having an outlet in the bottom, a member extending across the top of the tank above said outlet, a valve in the tank for opening and closing the outlet, said member having an opening therein large enough to permit the valve to pass through the same, a valve stem rising from the valve through said opening, and a cover plate for said opening loose on said stem above said member and adapted to be held by gravity on said member as the stem is raised and lowered.

5. In combination, a water-jacketed tank, an outlet fitting extending through the bottom of the tank and through the jacket, a discharge pipe, a detachable coupling between said pipe and the lower end of said fitting, a valve in the tank for controlling the entrance from the tank to the fitting, a valve stem rising from said valve above the top of the tank, and means at the top of the tank for holding said stem to permit it to be raised and lowered and to be bodily detached to remove the valve.

6. In combination, a tank having an outlet in the bottom, a valve stem rising from the valve, a support above the tank having a screw-threaded hole extending vertically through the same, a screw-threaded plug connected to the upper end of the stem so as to be rotatable relatively thereto and held against relative movements in the direction of the length of the stem, said plug extending through said hole, and a member on said plug for rotating the same with respect to said support.

In testimony whereof, I sign this specification.

WILLIAM RATZENSTEIN.